Figure 1:
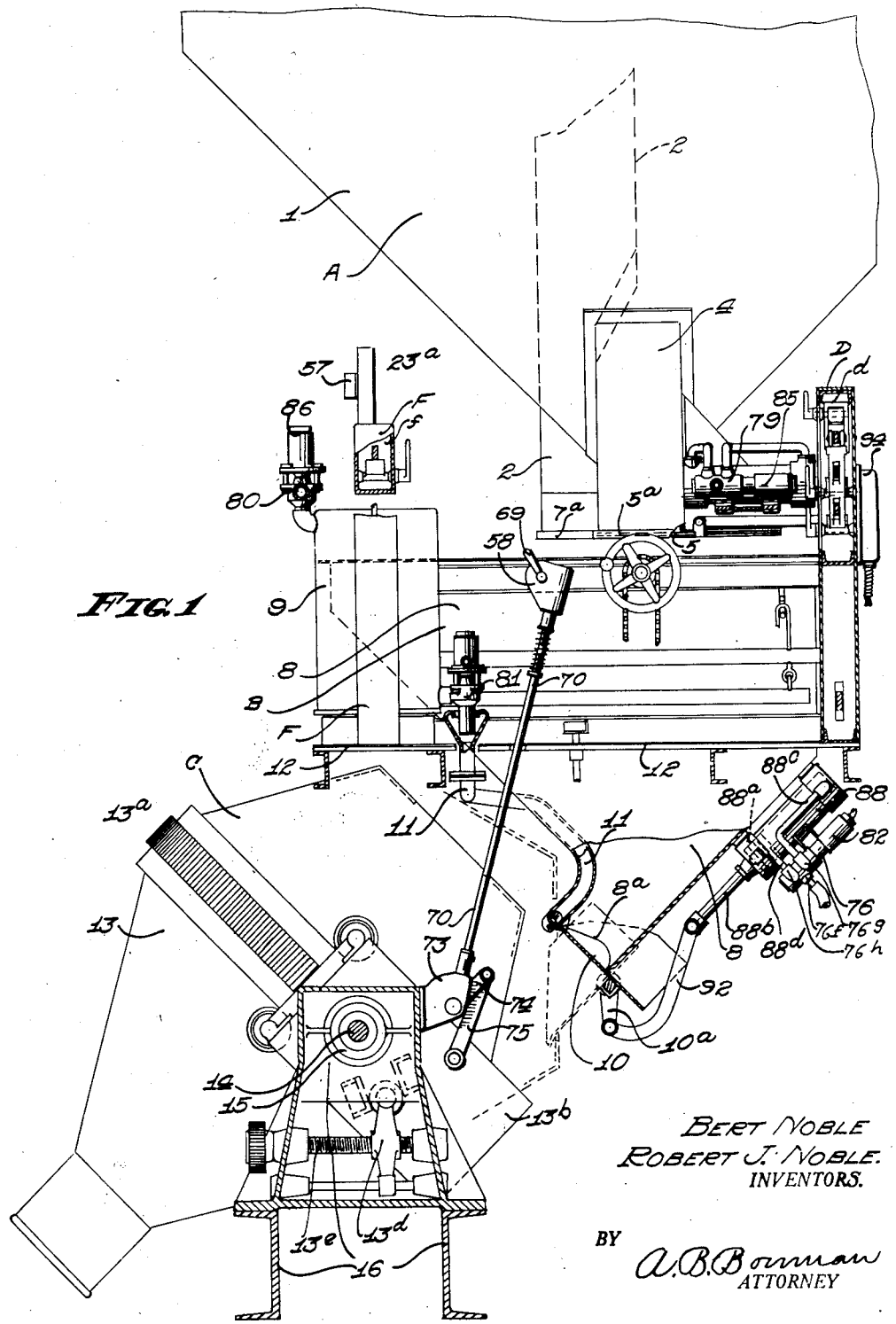

Feb. 14, 1933. B. NOBLE ET AL 1,897,490
AUTOMATIC CONCRETE AGGREGATE PROPORTIONING APPARATUS
Original Filed May 17, 1930 4 Sheets-Sheet 1

BERT NOBLE
ROBERT J. NOBLE.
INVENTORS.

BY A. B. Bowman
ATTORNEY

Feb. 14, 1933.    B. NOBLE ET AL    1,897,490
AUTOMATIC CONCRETE AGGREGATE PROPORTIONING APPARATUS
Original Filed May 17, 1930    4 Sheets-Sheet 2
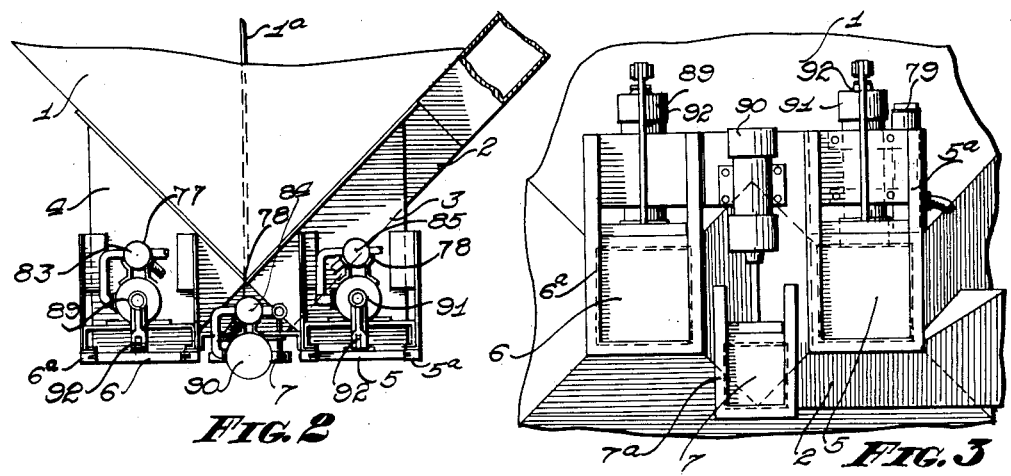
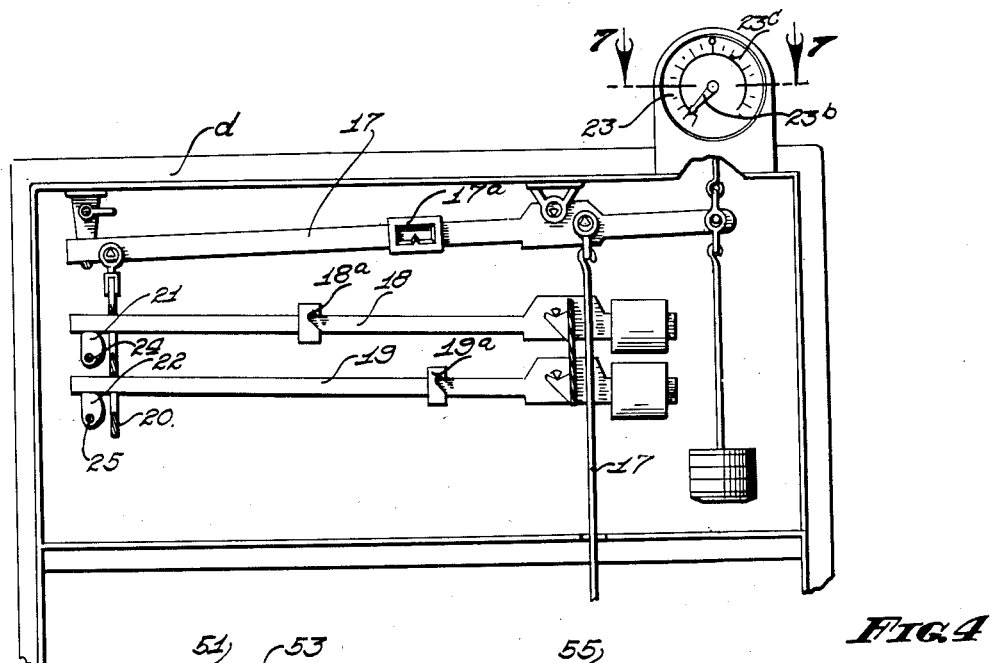
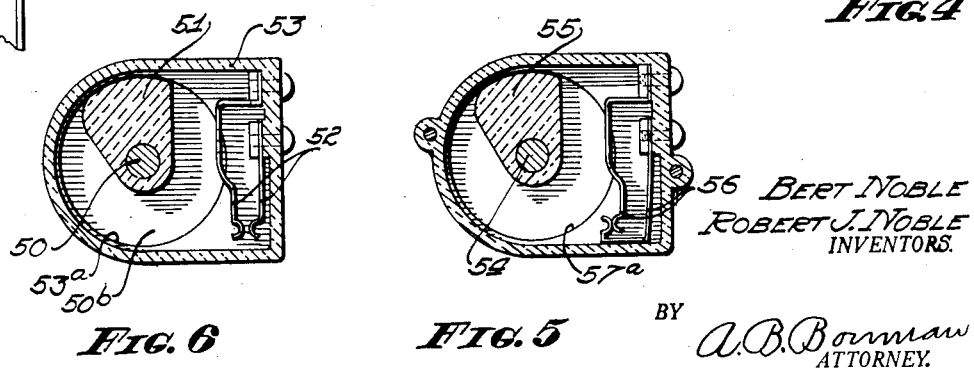
BERT NOBLE
ROBERT J. NOBLE
INVENTORS.
BY
A.B.Bonman
ATTORNEY.

Feb. 14, 1933. B. NOBLE ET AL 1,897,490
AUTOMATIC CONCRETE AGGREGATE PROPORTIONING APPARATUS
Original Filed May 17, 1930  4 Sheets-Sheet 3

INVENTORS
BERT NOBLE
ROBERT J. NOBLE
BY A.B.Bowman
ATTORNEY

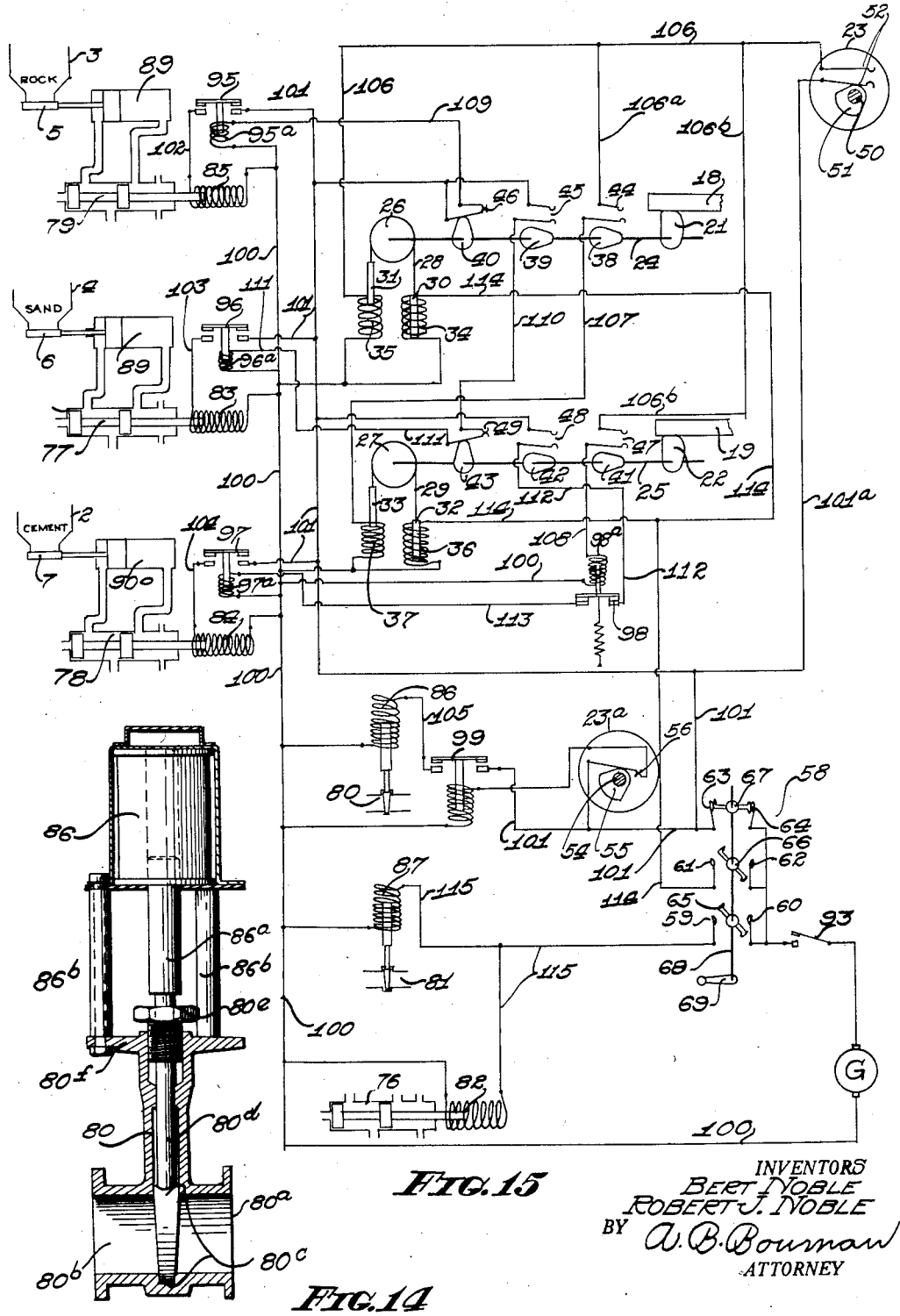

Patented Feb. 14, 1933

1,897,490

UNITED STATES PATENT OFFICE

BERT NOBLE AND ROBERT J. NOBLE, OF LOS ANGELES, CALIFORNIA, ASSIGNORS TO ROADS CONSTRUCTION COMPANY, LTD., OF LOS ANGELES, CALIFORNIA, A CORPORATION OF CALIFORNIA

AUTOMATIC CONCRETE AGGREGATE PROPORTIONING APPARATUS

Application filed May 17, 1930, Serial No. 453,168. Renewed July 28, 1932.

Our invention relates to aggregate proportioning apparatus, and the objects of our invention are:

First, to provide an aggregate proportioning apparatus which is automatic in operation;

Second, to provide an aggregate proportioning apparatus in which the materials are automatically sequentially delivered to the receiving hopper in accurate predeterminable proportions;

Third, to provide an aggregate proportioning apparatus in which the individual beams of the scale are automatically brought into operation in the correct sequence;

Fourth, to provide an aggregate proportioning apparatus in which the gates of the various bins wherein the separate materials are stored, are automatically opened and closed in response to the action of the scale beams;

Fifth, to provide an aggregate proportioning apparatus in which the gates of the receiving hoppers are automatically opened for delivering the aggregate to the mixing drum, when the latter is moved to the normal receiving and mixing position;

Sixth, to provide an aggregate proportioning apparatus in which certain scale beams are automatically brought into inactive position when the hopper gates are opened for discharging the aggregate into the drum;

Seventh, to provide manually controllable means for causing the apparatus to recommence a cycle of operation after each discharge of aggregate from the receiving hopper;

Eighth, to provide electrically controlled pneumatically operable gates for the material bins;

Ninth, to provide a system of control for the material gates in which correct sequence of operation with the corresponding setting of the scale is insured;

Tenth, to provide a system of control in which correct sequential operation of the material gates is effected by a common means actuated by the scale poise;

Eleventh, to provide a sequence operating device which is adjustable relative to the scale poise, enabling correction of lagging operation of the gates; and Twelfth, to provide an automatic aggregate proportioning mechanism which may be instantaneously stopped at any point of a cycle of operation and again set in operation without disturbing the correct sequence of operation and proportioning of materials in the interrupted cycle.

Figure 13:
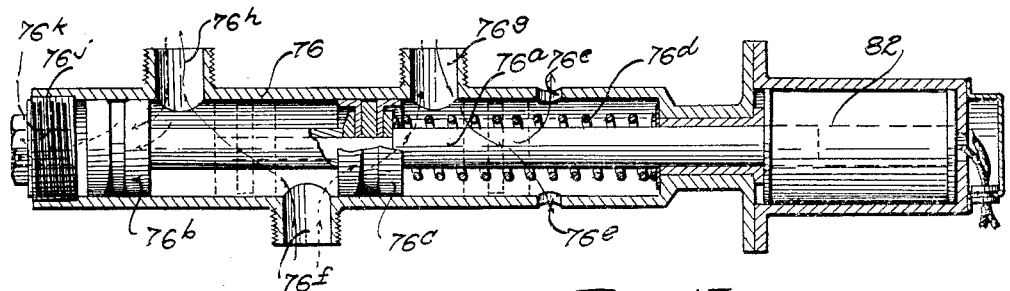
Figure 7:
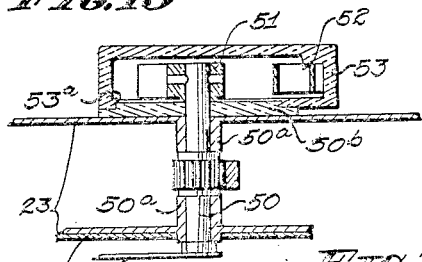
Figure 12:
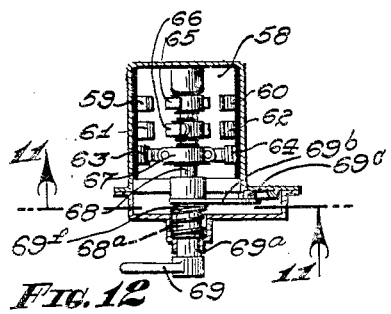
Figure 11:
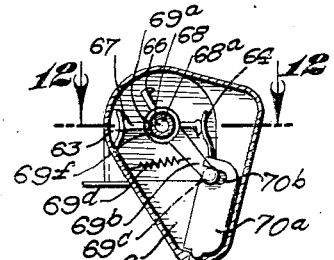
Figure 10:
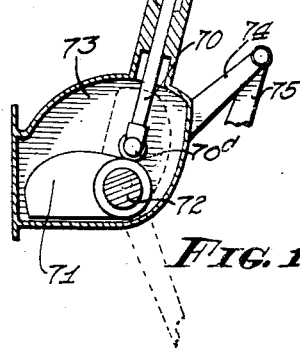
Figure 9:
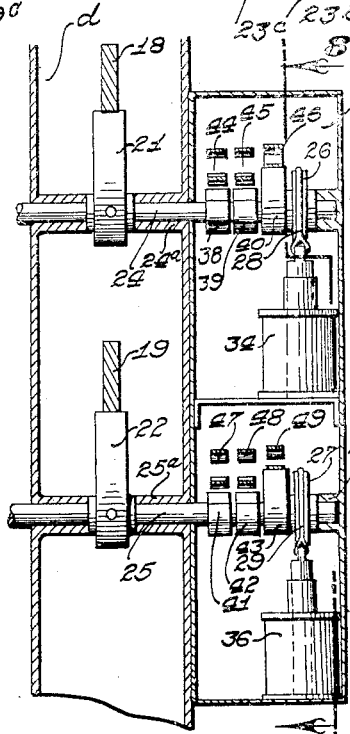
Figure 8:
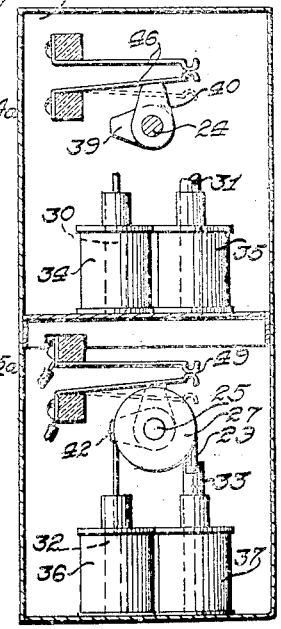

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is an elevational view of the apparatus, certain portions being broken away and other portions being shown in section in order to facilitate the illustration; Fig. 2 is a fragmentary end view of the apparatus showing the gate operating mechanism of the bin; Fig. 3 is a fragmentary plan view of the bin, gates, and gate-operating mechanism; Fig. 4 is an elevational view of the scale mechanism, certain portions being broken away and other portions in section, in order to facilitate the illustration; Fig. 5 is an enlarged end view of the water scale poise switch mechanism with the cover shown in section; Fig. 6 is a similar view of the aggregate, scale poise switch mechanism; Fig. 7 is a sectional view taken along the line 7—7 in Fig. 4; Fig. 8 is an enlarged sectional view of the control mechanism taken along the line 8—8 in Fig. 9; Fig. 9 is a side elevational view thereof, with a fragmentary sectional view of the scale mechanism; Fig. 10 is an enlarged fragmentary view of the main control switch operating mechanism, shown with certain parts in section; Fig. 11 is a sectional view of the main control switch taken along the line 11—11 in Fig. 12; Fig. 12 is a sectional view thereof taken along the line 12—12 in Fig. 11; Fig. 13 is a typical sectional view of the electrically operated valve mechanism; Fig. 10

14 is an enlarged fragmentary view of the electrically operated water valve mechanism; and Fig. 15 is a diagrammatical view of the connections embodied in the control system of our apparatus.

Similar characters of reference refer to similar parts and portions throughout the several views of the drawings.

Material bins 1, cement chute 2, spouts 3 and 4, bin gates 5, 6, and 7, aggregate hopper 8, water tank 9, aggregate gate 10, water pipe 11, platform 12, mix drum 13, trunnions 14, trunnion bearing 15, base 16, main scale beam 17, auxiliary beams 18 and 19, beam link 20, beam reset cams 21 and 22, tell-tale indicator 23, control shafts 24 and 25, sheaves 26 and 27, cables 28, and 29, cores 30, 31, 32, and 33, coils 34, 35, 36, and 37, cams 38, 39, and 40, 41, 42, and 43, contact finger pairs 44, 45, and 46, 47, 48, and 49, aggregate poise shaft 50, cam 51, contact fingers 52, casing 53, water poise shaft 54, cam 55, contact fingers 56, and casing 57, main control switch 58, contact fingers 59, 60, 61, 62, 63, and 64, contact segments 65, 66, and 67, shaft 68, handle 69, connecting rod 70, actuating cam 71, cam shaft 72, casing 73, crank 74, link 75, aggregate air valves 76, material air valves 77, 78 and 79, water inlet valve 80, and outlet valve 81 solenoids 82, 83, 84, 85, 86, and 87, pneumatic rams 88, 89, 90, and 91, gate actuating links 92, knife switch 93, contactor casing 94, and contactors 95, 96, 97, 98, and 99 constitute the principal parts and portions of our aggregate porportioning apparatus.

The general arrangement of my automatic proportioning apparatus for concrete aggregate includes a material bin A, which may have several compartments providing separate space for accommodating rock, sand and cement. This bin is supported by means, not shown in the drawings, over a receiving hopper B. The hopper B is supported in a conventional manner on a hopper scale, the details of which are not shown in the drawings, and said scale is suitably connected with the weighing mechanism G hereinafter described in more detail.

The hopper B is positioned over a conventional mixing drum C, which is adapted to be rotated around its longitudinal axis when in a horizontal position, as indicated in dotted lines in Fig. 1. Said mixing drum C is adapted to be tilted to the oblique full-line position shown in Fig. 1 when discharging the concrete mixer.

Referring now to the more specific details, the bin 1 is provided with a central partition 1a, thereby providing two compartments, one for receiving rock, and the other for receiving sand. From these compartments extend downwardly the spouts 3 and 4, the lower ends of which are positioned just above the upper edge of the hopper 8. The lower ends of the spouts 3 and 4 are closed by means of gates 5 and 6, respectively. Said gates are adapted to slide in frames 5a and 6a into position over the openings of the spouts 3 and 4, as clearly shown in Figs. 2 and 3. On the one outer side of the bin 1, a cement chute 2 extends to a position under the bin 1 substantially between the spouts 3 and 4.

The upper end of the chute 2 may be connected to a cement bin, or it may be in communication with a cement conveyor. These features are not shown in the drawings. The lower end is adapted to be enclosed by a gate 7, which is slidably held in the frame 7a. The gate 7 lies substantially in the same plane as gates 5 and 6, and is positioned directly over the hopper 8.

A water tank 9 is supported adjacent the hopper 8 on a suitable platform 12, which extends partially around the hopper 8, and enables access to the weighing mechanism D.

The lower end of the hopper is provided with an outlet opening 8a, over which a gate 10 is placed, preferably hinged along the lower margin of the opening 8a. A pipe 11 leads from the tank 9 to a position adjacent the outlet 8a for discharging water from the tank into the mixer.

The mixing drum 13 is of conventional design, having a circular driving rack 13a, with which suitable gears, not shown, are adapted to mesh for rotating the drum around its longitudinal axis when the latter is in a horizontal position. The drum 13 is mounted in a suitable cradle 13b, having trunnions 14 supported in trunnion bearings 15, which latter are supported on a base member 16.

Tilting of the drum is effected by means of the traveling member 13d which is moved back and forward, as required, by means of the screw shaft 13e, in any suitable manner.

The scale mechanism D, by means of which the weight of material discharged into the hopper is ascertained, is more clearly shown in Fig. 4. It comprises a main beam 17 which is connected by means of the rod 17b to the conventional main hopper supporting beam, not shown in detail. A poise 17a is slidably mounted on beam 17. The beam 17 is calibrated to suit the leverages of the weighing scale. Suitable means for neutralizing the weight of the hopper and other dead weight is provided for.

Auxiliary beams 18 and 19, having poises 18a and 19a, respectively, are pivotally supported below the main beam 17, and are adapted, by means of a link member 20 pivotally connected at its upper end to the outer end of beam 17, to supplement the weight of the main beam 17. Said beams 18 and 19 are held in their raised inoperative position clear of said link 20 by means of suitable cams 21 and 22. Thus, when cam 21, for instance, is rotated so as to allow beam 18 to rest on the link 20, the amount of material required in the hopper to balance the scale is equal to the sum indicated by poises 17a and 18a of the beams 17 and 18.

A poise tell-tale indicator is connected to the opposite end of the beam 17, enabling the condition of the balance to be readily ascertained, as material is being discharged into the hopper. The weighing mechanism is mounted within a suitable case $d$, which in turn is supported on the platform 12, as shown in Fig. 1.

On the rear side of the case $d$, is mounted the control mechanism C. The beam controlling cams 21 and 22 are secured to shafts 24 and 25, respectively, extending through the rear wall of the casing $d$, and journalled at their outer ends in bearings 24a and 25a. Shafts 24 and 25 are adapted to be rotated in an arc of substantially ninety degrees by means of the sheaves 26 and 27, respectively, secured to said shafts adjacent said bearings 24a and 25a, which are actuated by the cables 28 and 29, respectively. The latter support at their ends, cores 30, 31, 32, and 33, which are adapted to be attracted by the coils 34, 35, 36, and 37, as can be clearly seen in Figs. 8 and 9. Thus, when the cores 30 and 32 are drawn downwardly, cams 21 and 22 lift the beams 18 and 19 from the link 20, as indicated in Figs. 4 and 9, thus raising the beams to an inactive position.

On shaft 24, adjacent the sheave 26, are mounted the cams 38, 39, and 40. These cams are adapted to actuate the contact finger pairs 44, 45, and 46. Similar cams 41, 42, and 43 are mounted on shaft 25 and cooperate with contact pairs 47, 48 and 49.

It will be noted that with the cams 21 and 22 in their operating position, as illustrated in Fig. 9, the contact fingers 46 are in engagement, also contact fingers 49, while contacts 44, 45, and 47, 48 are out of engagement. Thus, in the case of the first-mentioned contact fingers, circuits are closed, while in the case of the other fingers, the circuits are open. Obviously, with the shafts 24 and 25 rotated to the other extreme position, the reverse condition will obtain. The purpose of the contact fingers will appear later.

The tell-tale indicator 23 is provided with a rearwardly extending shaft 50, suitably journalled in bearings 50a. (See Figs. 6 and 7.) On the extended end of the shaft 50 is secured a cam 51. This cam is adapted to engage one of a pair of contact fingers 52, mounted on the one wall of the casing 53 enclosing said cam and said contact fingers.

The position of the cam is so adjusted that the contact fingers 52 are brought into engagement when the tell-tale indicator 23 indicates a balanced position of the scale, with which it is associated. The operating surface of the cam is of a sufficient arc to allow the indicator 23 to swing past the normal balanced position without breaking the circuit after fingers 52 are brought into engagement with each other.

A second indicator switch mechanism mounted in a casing 57 is provided on the tell-tale indicator 23a which is associated with the water-weighing scale F, shown in Fig. 1, in section, positioned directly over the water tank 9.

It should be here noted that the water scale comprises a single weighing beam $f$, and is in no way associated with the electric control mechanism E other than by way of the switch mechanism controlled by indicator 23a. As shown in Fig. 5, a cam 55 is mounted on the poise shaft 54, of the poise 23a, and a pair of contact fingers 56 normally in mutual engagement are secured within the casing 57 enclosing said cam and contact fingers. The cam is adapted to break the circuit formed by the contact fingers 56 when the poise reaches the position in which the water scale is balanced. In both poise switch mechanisms, the casings 53 and 57 are adapted to be rotated around the axis of the poise shafts 50 and 54, in order to adjust the relative positions of the cam and the contact fingers. This provides for ready adjustment of the contact fingers relative to the poise hand 23b and to the poise scale 23c. It also allows for retarding or advancing the action of the contact fingers as may be found desirable in connection with the operation of the apparatus.

As shown in Figs. 6 and 7, the casing 53, has a circular opening 53a, concentric with the axis of the shaft 50. This opening is adapted to register with a complementary circular support 50b. Suitable clamp means, not shown, may be provided for securing the casing 53 in adjusted position.

A main control switch 58 is positioned within easy reach of the platform 12. As best shown in Figs. 11 and 12, said switch comprises three pairs of oppositely positioned contact fingers, namely, 59, 60, and 61, 62, and 63, 64. Rigidly mounted on a common rotatable shaft 68, and mutually insulated are contact segments 55, 56, and 67, which are each engageable with one pair of said contact fingers, as shown in Fig. 12, and also diagrammatically in Fig. 15.

In the one position of the switch 58, contact segment 65 is in engagement with the cooperating contact fingers. while contact segments 66 and 67 are disengaged from their cooperating contact fingers. In the opposite position, the reversed condition obtains.

At one end of the shaft 68 is mounted a handle 69, having a sleeve portion 69a, which is provided at its inner end with a crank member 69b. The outer end of the crank member 69b is provided with a crank pin 69c, extending parallel with the axis of shaft 68. A key 68a in the shaft 68 transmits rotary movement of the crank 69b through the sleeve 69a, and permits reciprocal movement of the sleeve 69a on the shaft 68. A helical spring 69d is secured at its one end to the casing 73a enclosing the switch, and at its other end to a point intermediate the ends of the crank 69b. This crank tends to force the switch 58 to the position indicated in Fig. 11, in which contact member 67 is in engagement with the contact fingers 63 and 64. Rotary movement of the crank 69b is effected by means of the rod 70, which has, at its upper end, a flat head portion 70a, in which a slot 70b is provided. This slot is adapted to receive the crank pin 69c. The sleeve 69a is normally forced inwardly by means of a spring 69f, thereby forcing the pin 69c into the slot 70b.

The lower end of the rod 70 is provided with a roller 70c, which is adapted to ride on a cam 71, rotatably mounted on a shaft 72, journalled within a casing 73. The latter is rigidly supported on the trunnion bearing 15.

The shaft 72 is provided with a crank 74, which is connected at its outer ends by means of a link 75, to the cradle 13c supporting the mixing drum 13. When the latter is in the oblique position, indicated in Fig. 1, the switch 58 occupies the position shown in Fig. 11.

When the drum 13 is moved to the horizontal position, the rod 70 is actuated by rotation of the cam 71, thereby moving the crank 69b to the upper position, in which contact segments 65 and 66 are in engagement with their corresponding contact fingers 59, 60, and 61, 62, respectively, while contact segment 67 is out of engagement with the fingers 63 and 64.

The upward movement of the crank 69b is against the tension of the spring 69d. In drawing outwardly on the handle 69, pin 69c is withdrawn from slot 70b while the head 70a occupies the upper position, and the switch is pulled back to the position indicated in Fig. 11, by spring 69d, the pin 69c sliding over the head 70a. The purpose of this will be explained later.

The aggregate gate 10 on the hopper 8 is movel into its open and closed positions by means of the pneumatic ram 88, which comprises a cylinder, in which is reciprocally mounted a plunger 88a, indicated in dotted lines in Fig. 1, mounted on a piston rod 88b, the latter connected at its outer end, by means of a link 92, to a crank 10a connected with the gate 10, at its hinged end.

Air passages 88c and 88d lead to opposite ends of the cylinder 88 from an air valve 76, an enlarged view of which is found in Fig. 13. This valve is substantially cylindrical in form, and is provided with a piston rod 76a, on which are secured the pistons 76b and 76c in spaced relation. The piston rod is resiliently held at one end of the cylinder by means of a spring 76d, and is adapted to be drawn against the tension of the spring toward the other end of the cylinder by means of the solenoid 82, the extended end of the piston rod 76a being drawn into the solenoid when the latter is energized. Under the latter condition, the pistons assume the dotted line position shown in Fig. 13. The valve is provided with an inlet 76f positioned intermediate the pistons 76b and 76c in any position being occupied by the latter. Spaced apart outlets 76g and 76h are so positioned relative to the pistons that they are alternately connected with and cut off from the inlet 76f. The one end of the cylinder is provided with a plug 76j, having a central perforation 76k, while the other end thereof is provided with radial ports 76e, the perforation and the openings serving to exhaust the air from the ram cylinder as the piston in the latter is forced from one position to the other.

The inlet 76f of the valve is connected to a source of compressed air, not shown. The outlet 76g is connected by means of the air passage 88c, with the one end of the ram cylinder 88, while the outlet opening 76h is connected by means of the air passage 88d with the opposite end of the cylinder.

Obviously, with the valve pistons in the position shown in full lines in Fig. 13, air will pass through the opening 76f between the pistons 76b and 76c, through the openings 76h, and passage 88d, to the lower end of the cylinder 88, shown in Fig. 1, thereby forcing the piston 88a to the upper position, thus opening the gate 10. The air in the ram finds a path through the passage 88c, opening 76g into cylinder 76, and out through ports 76e.

The converse operation takes place when the solenoid 82 is excited and the pistons 76b and 76c are drawn to the dotted line position shown in Fig. 13.

The gates 5, 6, and 7 are provided with similar rams 89, 90, and 91, each of which is controlled by means of the valves 77, 78, and 79, as clearly shown in Figs. 2 and 3. Each valve is provided with a solenoid 83, 84, and 85, respectively. Their connection and operation is identical with that described in connection with ram 88, and valve 76, with the exception that ram 90 is preferably directly connected by means of the piston rod 90a with gate 7.

The two water valves 80 and 81 are provided, one for controlling the flow of water into the tank 9, the other for allowing the tank to discharge. Their relative position is shown in Fig. 1. The structures of the valves 80 and 81 are shown in Fig. 14, the reference characters applying particularly to valve 80. The valve body is a conventional gate valve, having the inlet end 80a and outlet end 80b and an intermediate stem housing portion for receiving a slidable gate member 80c. The latter is adapted to be raised by means of the solenoid 86. A core 86a is supported at the upper end of the gate stem 80d, as clearly shown in Fig. 14, the latter passing through a suitable bushing 80e in the upper end of the stem housing portion, and a solenoid 86 is supported in rigid relation with the valve body by means of spacers 86b, secured at their lower end to a suitable flange 80f forming a part of the stem housing. Positioned adjacent the controlling mechanism E, is a casing 94, shown in Fig. 1, enclosing the contactors 95, 96, 97, and 98, which, as shown in Fig. 15, are interconnected with the solenoid and the controlling mechanism. The electric circuits are illustrated in Fig. 15. The source of supply G is connected at its one pole to a common return lead 100, at its other pole to the one pole of the knife switch 93, the other pole thereof being connected with the contact fingers 60, 62, and 64 of the main control switch 58.

A common supply conductor 101 connects contact fingers 63 of said main control switch with the one pole of the contactors 95, 96, 97, and 99. The other poles of said contactors are connected by the conductors 102, 103, 104, and 105, with the one terminal, respectively, of the solenoids 85, 83, 84, and 86, the other terminals of said solenoid being connected with the common return 100. Thus, as each contactor is actuated, the circuits will be closed to the corresponding solenoid, thereby actuating the therewith connected valves.

A branch 101a leads from the contact finger 63 to one of the indicator switch contact fingers 52; from the opposite contact finger 52, a lead 106 connects with the one terminal of coil 35, the other terminal thereof being connected to the return lead 100. A branch connection 106a connects with the one contact finger 44, the other contact finger 44 being connected by means of the lead 107, with the one terminal of the coil 37, the other terminal thereof being connected with the common return 100.

A further branch 106b leads to the one contact finger 47, the other contact finger 47 being connected with the solenoid 98a of the contactor 98, by means of the conductor 108. The other terminal of the solenoid 98a is connected to the common return 100. One of the contact fingers 46 is connected by means of the conductor 109 with the coil 95a of the contactor 95, the other terminal of which is connected to the common return 100. The other contact finger 46 is connected to the supply conductor 101. One contact finger 45 is connected with supply conductor 101, while the other contact finger 45 is connected by means of conductor 110, with one contact finger 49. The other contact finger 49 is connected by conductor 111, with coil 96a of the contactor 96, the other terminal of which is connected with the common return conductor 100.

One contact finger 48 is connected to the common supply conductor 101, while the other contact finger 48 is connected by means of conductor 112, with the one terminal of the contactor 98. The other terminal of contactor 98 is connected by means of conductor 113, with the coil 97a of contactor 97. The other terminal of coil 97a is connected to the common return conductor 100.

Contact finger 61 of the main control switch 58 is connected by means of the conductor 114, with the one terminal of coils 34 and 36, respectively, the other terminals of said coils being connected with the common return conductor 100. Contact finger 59 of the main control switch is connected by means of conductor 115, with the one terminal, respectively, of the solenoids 82 and 87, the other terminals thereof being connected to the common return conductor 100.

Prior to setting the apparatus in operation, a suitable supply of rock, sand, and cement is provided in the bins. The poises 17a, 18a, and 19a are adjusted to the correct position on the beams 17, 18, and 19, respectively, for obtaining the desired proportioning of the several materials and an amount equal to the normal batch for depositing in the hopper 8. The main control switch 58 occupies the position shown in Fig. 15, and in Fig. 10, that is, with the rod 70 in its lower position, which corresponds to the position of the drum 13, indicated in dotted lines in Fig. 1.

The hopper is empty, and all gates are closed. Knife switch 93 is then closed. Current passes from the generator G through the switch 93 to contact fingers 64, by way of contact segment 67 to contact finger 63, and supply conductor 101, thence to the contact fingers 46 of the control mechanism, which are held by means of the cam 40 in mutual contact, thence through the conductor 109, to the contactor coil 95a of contactor 95, thence back to the generator G by way of the common return conductor 100. Contactor 95 is thus closed, thereby connecting the solenoid 85 to the supply conductor 101, and consequently closing the circuit to generator G. The solenoid 85 being energized, the valve mechanism 79 comes into operation, whereby gate 5 is opened and rock falls from the rock bin into the hopper. As the beams 18 and 19 are held inoperative by the cams 21 and 22, only the beam 17 is active, and as the load approaches that set by the poise 17a on beam 17, tell-tale indicator 23 commences to rotate towards the zero point on indicator scale 23c.

This causes shaft 50 to rotate and carry with it cam 51, which causes contact fingers 52 to mutually engage at the moment the indicator hand 23b registers with the zero point of the scale 23c. The moment contact fingers 52 engage, the circuit is closed from conductor 101, through the branch conductor 101a and the contact fingers 52, through the conductor 106, to the coil 35, and back to the supply by way of the common conductor 100. When the coil 35 is energized, the core 31 is attracted, thereby rotating shaft 24. This causes cam 40 to release the contact fingers 46 and interrupt the circuit through the contactor coil 95a, which in turn opens contactor 95 and the circuit to the solenoid 85, and allows the valve 79 to assume the position in which the ram 91 closes gate 5, thus shutting off the supply of rock. There will be a short time interval between the moment the contact fingers 52 engage and the gate closes.

Compensation therefor can be made by shifting the contact finger casing 53 in such a manner that the contact fingers are engaged by the cam in any suitable interval before the hand 23b of the indicator 23 reaches the zero point.

A moment after the cam 40 releases the contact fingers 46, cams 38 and 39 cause contact finger pairs 44 and 45 to mutually engage. Thereby a circuit is closed by way of the conductor 101, contact fingers 45, and conductor 110, and the contact fingers 49, which are at this time closed, and the conductor 111, through the contactor coil 96a, thereby closing contactor 96, closing the circuit to the solenoid 83, which actuates valve 77, and causes the latter to pass air to the ram 89, thereby opening the sand gate 6.

Just previous to this action taking place, beam 18 is allowed to fall onto link 20, due to the fact that in rotating the shaft 24, cam 21 is moved from under the outer end of the beam 18. The moment that beam 18 falls onto link 20, thereby unbalancing the scale and causing beam 17 to drop downwardly, tell-tale indicator shaft 50 is rotated backwardly and contact fingers 52 are disengaged, thereby opening circuits formed in part by conductor 106. This is important since a moment afterwards the contact fingers 44 are brought into engagement by the cam 38 rotating with shaft 24, thus connecting coil 37 by way of conductor 107 and branch conductor 106a, with the one finger of the contact 52. Thus, the solenoid 37 remains unexcited until such time as the tell-tale indicator 38 again moves towards the zero position, which will take place when the correct amount of sand has been deposited in the hopper. In this case, beams 17 and 18 will jointly swing upwardly, it being noted that beam 18 is moved upwardly by virtue of the link 20 engaging the outer end of the beam 18 and drawing it up by the movement of beam 17.

The moment cam 51 of indicator 23 again reengages contact fingers 52, a circuit is closed by way of conductors 106, 106a, contact fingers 44, conductor 107, to coil 37, and thence back through conductor 100 to the supply. This causes coil 37 to attract core 33 and rotate shaft 35. Rotation of shaft 35 moves the cam 32 from under beam 19, and allows the latter to drop onto link 20. This action is followed by retrogressive movement of the indicator 23 and disengagement of contact fingers 52. At the same time, cam 43 releases contact fingers 49, and thereby deenergizes coil 96a and causes contactor 96 to open and deenergize solenoid 83.

Cam 41 also brings contact fingers 47 into mutual engagement, thus closing the circuit from the poise switch by way of conductor 106b, through contact fingers 47, conductor 108, to coil 98a of contactor 98, through said coil and back to the supply by way of conductor 100.

Contactor 98 is normally held by means of a spring or other arrangement in a closed position. Thus, when contact fingers 48 are brought into mutual engagement by the cam 42, a circuit is closed by way of conductor 101, contact fingers 48, conductor 112, contactor 98, and conductor 113, to contactor coil 97a, thereby closing contactor 97, and closing a circuit to solenoid 84, which, in turn, causes operation of valve 78, and opening of cement gate 7.

It should here be noted, however, that contact fingers 47 are not closed until tell-tale switch 52 is open, so that coil 98a for the time being remains unexcited. As the balance is approached and the tell-tale indicator hand 23b swings towards the zero point on the scale, contactor fingers 52 are again brought into mutual engagement, and as the engagement of contact fingers 47 has been established, the circuit is closed by way of conductor 106b, contactor fingers 47, through the coil 98a, which thus opens contactor 98, and interrupts the circuit to contactor coil 97a, which in turn causes contactor 97 to open and deenergizes solenoid 84. The cement gate is in consequence again closed.

During the operation in which the various materials are deposited in the hopper, a circuit is formed through the water scale tell-tale mechanism 23a, including the contact fingers 56, and conductor 116, to coil 99a of the contactor 99, thus causing contactor 99 to be closed and forming a circuit from conductor 101, contactor 99, conductor 105, to solenoid 86, which, when energized opens valve 80, allowing water to enter the tank 9. When the correct amount of water is weighed off, indicator 23a, which acts in the identical manner as indicator 23, causes the cam 55 to disengage contact fingers 56, thereby opening the circuit to coil 99a, and causing contactor 99 to open and solenoid 86 to be deenergized, thus allowing valve 80 to again close. The lag due to time taken to operate the contactor and valve may be corrected by shifting the casing 57, and thereby the contactor 56, relative to the indicator cam 55.

As the requisite material is now in the hopper, drum 13 is swung to the horizontal position by conventional means, not shown in the drawings. This movement causes the link 75 to swing crank 74 clockwise, and cause cam 71 to move rod 70 upwardly, which causes switch 58 to move into the position in which segment 67 becomes disengaged from fingers 63 and 64, while segments 65 and 66 make contact with the respective contact fingers 59—60, and 61—62. Segment 66 closes a circuit through conductors 114 to the reset coils 34 and 36, which thereby immediately attract cores 30 and 32, rotating the shafts 24 and 25, and raising beams 18 and 19, by means of cams 21 and 22. The scale is thus kept in its initial position, while the various electrical connections are again made for recommencing the cycle of operation just completed.

Contact segment 65 connects contact fingers 59 and 60 together so that current flows through conductor 115, to the solenoids 82 and 87. Solenoid 87 opens the water discharge valve 81, while solenoid 82 actuates valve 76 and causes the aggregate gate 10 to be opened by means of the ram 88 drawing on the link 92.

After the aggregate from the hopper 8 and the water from the tank 9 has been deposited in the mixer drum 13, the main control switch 58 is manually shifted into the initial position, shown in Fig. 15, whereby the circuit to the reset coils 34 and 36 and the circuit to solenoids 82 and 87 are interrupted, deenergizing solenoids 82 and 87, allowing the aggregate gate 10 and the discharge valve 81 to be closed. Deenergizing coils 34 and 36 does not change any conditions as far as the control mechanism is concerned, since the cores remain in their shifted positions.

Contact segment 67 of main switch 58 again energizes the supply conductor 101, and as the scale and the control mechanism have been reset, the cycle of operation recommences.

It will be noted that the main control switch 58 can be switched over by hand by withdrawing the handle 9, thereby releasing the pin 69c from notch 70b, and allowing spring 69d to draw the switch to the position shown in Fig. 11. While the second batch of aggregate is being weighed off, the drum may be rotated in order to mix the first batch of aggregate deposited therein, the mixture may then be discharged from the drum by pivoting the latter by means of its cradle 13c. This action causes the rod 70 to drop from its upper position to the lower position, indicated in Fig. 11. The pin 69c slides across the flat surface of the head 70a and drops into the notch 70b when it registers therewith.

Assuming that during the mixing and the discharging period, the second weighing cycle has been completed, which terminates when the cement has been weighed, the drum now in the oblique position, shown in Fig. 1, is rotated to the horizontal position. This again moves the switch by means of the rod 70 to the position in which the hopper 8 and water discharge valve are open, and the second batch is then deposited in the mixing drum. Thus, the only attention required from the operator by the control mechanism is that given to the main control switch 58, which is manually reset after each discharge from the hopper so that the weighing cycle may again commence.

Should it at any time be necessary to discontinue operation of the apparatus, it is merely necessary to open switch 93. When this is done, no matter what operation is in progress, each or any solenoid at the moment energized will be deenergized, thus closing the corresponding gate, and interrupting the operation in progress.

If switch 93 is again closed, after carrying out the desired adjustments, the operations will continue in the proper order and without in any way affecting the correct proportioning of the aggregate.

Though we have shown and described a particular construction, combination and arrangement of parts and portions, we do not wish to be limited to this particular construction, combination and arrangement, but desire to include in the scope of our invention the construction, combination and arrangement of parts and portions substantially as set forth in the appended claims.

Having thus described our invention, what we claim as new and desire to secure by Letters Patent is:

1. In a device of the class described, a material bin, an aggregate hopper, scale means for individually weighing separate materials deposited in said hopper, gate means for controlling the discharge of material from said bin, pneumatic rams for opening and closing said gates, valve means for controlling said rams, and means for electrically controlling said valves and causing said gates to operate sequentially in predetermined order.

2. In a device of the class described, the combination with a material bin having a plurality of compartments provided with individual gates, and aggregate hopper of a scale means for weighing said hopper, including a plurality of weight-regulating beams, means for raising certain of said beams to an inactive position, means for automatically sequentially releasing said raised beams as material is deposited in said hopper, and means coincidently operable with said releasing means for sequentially operating said gates, whereby material from each compartment is automatically discharged and weighed in said hopper.

3. In a device of the class described, the combination with a material bin having a plurality of compartments provided with individual gates, and aggregate hopper, of a scale means for weighing said hopper, including a plurality of weight regulating beams, means for raising certain of said beams to an inactive position, means for automa .cally sequentially releasing said raised beams as material is deposited in said hopper, a tell-tale indicator associated with said scale and responsive to each balancing condition thereof, electrical switch means operable by said indicator, means electrically connected with said switch means and operable on actuation thereof, for releasing one of said beams at each response of said indicator following the deposit of each material in said hopper, and means coincidently operable with said beam releasing means for closing the gate of a compartment from which one material has been deposited and other means coincidently operable therewith for opening the gate of a second compartment, whereby the material from each compartment is deposited according to predetermined amounts.

4. In a device of the class described, the combination with a plurality of material storage bins having individual gates and a receiving hopper, of a scale means for weighing said hopper, a main weight-regulating beam, a plurality of auxiliary weight-regulating beams, means for supporting said auxiliary beams in inoperative position relative to said main beam, means for opening one of said gates, means responsive to movement of said main beam for releasing said auxiliary beams, when said hopper reaches an initial balanced condition, other means for controlling the sequence in which said auxiliary beams are reelased, and means associated wi.h said sequence controlling means for automatically causing the closing of said first gate and correct sequential opening and closing of said other gates.

5. The combination with a plurality of material bins having gates and a receiving hopper, of scale means for sequentially weighing separate materials delivered from said bins into said hopper, means for automa.ically and sequentially opening and closing said gates responsive to the condition of balance of said scale means, a gate on said hopper, a mixing drum movable from a discharging position into a loading position relative to said hopper gate, a means operative on movement of said drum from said discharge position to said loading position for automatically opening said hopper gate.

6. The combination with a plurality of material bins having gates and a receiving hopper, of scale means for sequentially weighing separate materials delivered from said bins into said hopper, a source of compressed air supply, pneumatic ram means connected with said gates, means for controlling the supply of air to said rams for opening and closing said gates, a manually controllable means for effecting the opening of one of said gates, means responsive to the balance condition of said scale for effecting the closing of said first gate and sequentially effecting the opening and closing of said other gates for delivering predetermined amounts of material from each bin into said hopper.

7. In an aggregate weighing and mixing apparatus, a plurality of material storage bins, having individual gates, a hopper, a scale for weighing said hopper with successive amounts of materials delivered from said bins, manually controlled means for opening one of said gates, means responsive to the successive balanced conditions of said scale for sequentially closing said first gate and opening and closing said other gates until material from each bin has been delivered and weighed in said hopper, a gate for said hopper, a mixing drum movable into receiving relation with said hopper, and means operable on opening of said hopper gate for rendering inoperative said bin gates until said hopper gate is again closed.

8. In an automatic aggregate weighing and discharging apparatus, a plurality of material bins, a receiving hopper, means for automatically discharging material from each bin into said hopper in predetermined quanti.ies, a gate on said hopper, a mixing drum movable into receiving relation with said hopper, means for opening said hopper gate for discharging said materials from said hopper into said drum, and interlock means associated with said hopper gate and said automatic means for preventing discharge of material into said bins while said hopper gate is open.

9. In a concrete aggregate proportioning device, a plurality of material bins, each containing a different material to form the aggregate and each provided with a gate through which the material may pass, a hopper positioned relative to said gates to receive successively the material from said bins and temporarily retain the same during weighing, a weighing device supporting said hopper having a separate cooperating counterpoise for each of said materials, and means for bringing said counterpoise means successively into action to successively measure the weights of material from each of said bins.

10. In a concrete aggregate proportioning device, a plurality of material bins each containing a supply of different material forming an aggregate and each of said bins being provided with a gate through which the material in the bin may pass, a hopper positioned to receive material from said gates, a weighing device for said hopper including a plurality of counterpoises, one for each separate material, means for separately placing said counterpoises into and out of action and means operably responsive to the balancing of one of said counterpoises by the ingress of one of said materials to said hopper for placing the counterpoise for the next material into effective operation.

11. In a concrete aggregate proportioning device, a plurality of material bins each containing a supply of different material forming an aggregate and each of said bins being provided with a gate through which the material in the bin may pass, a hopper positioned to receive material from said gates, a weighing device for said hopper including a plurality of counterpoises, one for each separate material, means for separately placing said counterpoises into and out of action, means operably responsive to the balancing of one of said counterpoises by the ingress of one of said materials to said hopper for placing the counterpoise for the next material into effective operation, and means operably responsive to the balancing of the counterpoise for any of said materials for actuating the gate for that material to close the same.

12. In a concrete aggregate proportioning device, a plurality of material bins each containing a supply of different material forming an aggregate and each of said bins being provided with a gate through which the material in the bin may pass, a hopper positioned to receive material from said gates, a weighing device for said hopper including a plurality of counterpoises, one for each separate material, means for separately placing said counterpoises into and out of action, means operably responsive to the balancing of one of said counterpoises by the ingress of one of said materials to said hopper for placing the counterpoise for the next material into effective operation, a mixer for receiving the material from said hopper, a gate on said hopper for controlling the flow of material to said mixer, means for controlling said gate to open and close the same, means for measuring a predetermined quantity of water for the mixture, and means operably responsive to the actuation of the control to open said hopper gate for discharging said water into said mixer.

13. In a concrete aggregate proportioning device, a plurality of material bins each containing a supply of different material forming an aggregate and each of said bins being provided with a gate through which the material in the bin may pass, a hopper positioned to receive material from said gates, a weighing device for said hopper including a plurality of counterpoises, one for each separate material, means for separately placing said counterpoises into and out of action, means operably responsive to the balancing of one of said counterpoises by the ingress of one of said materials to said hopper for placing the counterpoise for the next material into effective operation, a mixer for receiving the material from said hopper movable from a discharge position to a charge position, a gate on said hopper for passing materials from said hopper to said mixer when said mixer is in the charge position, and means operably responsive to the movement of said mixer to charge position for opening said hopper gate.

14. In a concrete aggregate proportioning device, a plurality of material bins each containing a supply of different material forming an aggregate and each of said bins being provided with a gate through which the material in the bin may pass, a hopper positioned to receive material from said gates, a weighing device for said hopper including a plurality of counterpoises, one for each separate material, means for separately placing said counterpoises into and out of action, means operably responsive to the balancing of one of said counterpoises by the ingress of one of said materials to said hopper for placing the counterpoise for the next material into effective operation, a mixer for receiving the material from said hopper movable from a discharge position to a charge position, a gate on said hopper for passing materials from said hopper to said mixer when said mixer is in the charge position, and means operably responsive to the movement of said mixer to charge position for opening said hopper gate, means for measuring a predetermined quantity of water for said mixer, and means operably responsive to the movement of said mixer to charge position for discharging said water to said mixer.

15. In a concrete aggregate proportioning device, a plurality of material bins each containing a separate material for said aggregate and each having a gate through which material may pass, a hopper positioned to receive material from said gates, means for weighing said hopper and said materials including means for balancing said hopper with a predetermined weight of one of said materials, means for balancing said hopper with said first material and a predetermined weight of a second material, means for balancing said hopper with said first two materials and an additional predetermined weight of a third material, means normally holding all of said balancing means except said first named means out of balancing relation with said hopper, means operably responsive to the balancing of said first named balancing means for placing said second named balancing means into effective operation, and means operably responsive to the balancing of said second named balancing means for placing said third balancing means into effective operation.

16. In a concrete aggregate proportioning device, a plurality of material bins each containing a separate material for said aggregate and each having a gate through which material may pass, a hopper positioned to receive material from said gates, means for weighing said hopper and said materials including means for balancing said hopper with a predetermined weight of one of said materials, means for balancing said hopper with said first material and a predetermined weight of a second material, means for balancing said hopper with said first two materials and an additional predetermined weight of a third material, means for bringing said balancing means into successive effective relation with said hopper, and means operably responsive to the balancing of said hopper by any of said balancing means for automatically placing the next balancing means into effective operation.

In testimony whereof, we have hereunto set our hands at San Diego, California, this 28th day of April, 1930.

BERT NOBLE.
ROBERT J. NOBLE.